United States Patent
Tanasi

(10) Patent No.: US 6,998,430 B2
(45) Date of Patent: Feb. 14, 2006

(54) SYNTHETIC STUCCO COMPOSITIONS

(75) Inventor: Ernesto Tanasi, Palazzolo Acreide (IT)

(73) Assignee: Ditan Color SRL, Palazzolo Acreide (IT)

( * ) Notice: Subject to any disclaimer, the term of this patent is extended or adjusted under 35 U.S.C. 154(b) by 211 days.

(21) Appl. No.: 10/387,390

(22) Filed: Mar. 14, 2003

(65) Prior Publication Data

US 2004/0181001 A1 Sep. 16, 2004

(51) Int. Cl.
*C08K 7/00* (2006.01)

(52) U.S. Cl. .......................... 523/220; 524/44; 524/378; 524/388; 524/417; 524/425; 524/430; 524/497; 524/423; 525/5

(58) Field of Classification Search ................ 523/220; 524/44, 378, 388, 417, 425, 430, 497, 423; 525/5
See application file for complete search history.

(56) References Cited

U.S. PATENT DOCUMENTS

| | | | | | |
|---|---|---|---|---|---|
| 3,974,674 | A | * | 8/1976 | Orozco et al. | 72/42 |
| 4,105,816 | A | * | 8/1978 | Hori | 428/159 |
| 4,293,599 | A | * | 10/1981 | Hori et al. | 427/274 |
| 4,351,912 | A | * | 9/1982 | Jasperson | 523/218 |
| 4,563,491 | A | * | 1/1986 | Comune | 524/47 |
| 4,871,610 | A | * | 10/1989 | Takata et al. | 442/394 |
| 4,904,709 | A | * | 2/1990 | Hermele | 523/220 |
| 5,951,752 | A | * | 9/1999 | Johansen et al. | 106/712 |
| 6,063,472 | A | * | 5/2000 | Takaoka et al. | 428/70 |
| 6,299,679 | B1 | * | 10/2001 | Montoya | 106/730 |
| 6,515,062 | B2 | * | 2/2003 | Jesionka | 524/447 |
| 6,686,044 | B2 | * | 2/2004 | Nakai et al. | 428/403 |
| 6,770,354 | B2 | * | 8/2004 | Randall et al. | 428/219 |

FOREIGN PATENT DOCUMENTS

GB 2097011 A * 11/1982

* cited by examiner

*Primary Examiner*—Peter D. Mulcahy
(74) *Attorney, Agent, or Firm*—Young & Thompson

(57) ABSTRACT

The present invention relates to a synthetic antique-effect wall stucco for interiors and exteriors, with a smooth matt or translucent appearance, and its preparation process.

8 Claims, No Drawings

SYNTHETIC STUCCO COMPOSITIONS

The present invention relates to a synthetic antique-effect wall stucco for interiors and exteriors, with a smooth matt or translucent appearance, and its preparation process.

BACKGROUND OF THE INVENTION

Synthetic stucco compositions have been known for some time, and all of them solve one or more of the problems associated with the use of natural stuccoes, which have been used for hundreds of years. U.S. Pat. No. 4,351,912, for example, relates to the manufacture of a light, spreadable synthetic stucco which contains light aggregates.

U.S. Pat. No. 4,563,491 relates to the manufacture of a synthetic stucco that incorporates a cooked flour paste which makes the product resistant to various environmental conditions, ultraviolet radiation, damp, salt water spray, fire and heat effects.

U.S. Pat. No. 6,515,062 discloses a method for obtaining a decorative synthetic stucco with a bright metallic appearance constituted by a synthetic stucco and approx. 200 mesh aluminium metal pigments. This stucco is distinguished from others by the "breathability" of the material, which eliminates the problems associated with bubble formation and condensation.

DISCLOSURE OF THE INVENTION

The present invention relates to an antique-effect synthetic stucco with a matt or translucent appearance.

The typical "antique effect" is produced by the specific composition of the product, and in particular by the choice of coated fillers based on calcium carbonates, and the quantity of metal-oxide-based coloured inorganic pigments used.

At the application stage, this produces colour effects which resemble decorative antique finishings.

The synthetic decorative stucco of the invention is characterised by good water repellency due to the simultaneous participation of acrylic polymer resins and mineral fillers based on calcium carbonates, coated with plasticising agents.

In view of the relative quantities of said two components the stucco exhibits hydrophobic behaviour, while at the same time maintaining a fair degree of water vapour breathability.

DETAILED DESCRIPTION OF THE INVENTION

The synthetic stucco of the invention is characterised by coated mineral fillers based on calcium carbonates and an acrylic resin in aqueous dispersion, together with conventional components of stucco such as binders, pigments, dispersing, coalescing, anti-foaming and wetting agents, plasticisers, solvents and preservatives.

The fillers used in this invention are calcium carbonates with a particle size not exceeding 10 $\mu$m, coated with a film of sodium stearate, which are marketed under the brand name Master® and supplied by Mineraria Sacilese S.p.a (Italy).

The polymer resins used in the invention include ethyl acrylate polymers, polymers containing units of butyl acrylate, acrylic and methacrylic acids and their esters. They are synthetic resins with a low content of residual monomers (monomer residue less than 100 ppm) and a molecular weight of approx. 1,000,000 Daltons. These polymers are commercially available, for example under the brand name Craymul 2222, supplied by Cray Valley S.r.l.

The calcium carbonate fillers are present in percentages ranging from 50 to 70% by weight, and preferably from 60 to 65%, while the acrylic resins in aqueous dispersion are present in the percentage of between 15 and 25%, preferably between 18 and 23%, on the weight of the composition.

The binders used in the composition of the invention include, for example, sodium carboxymethylcellulose, methyl hydroxyethyl cellulose, ethyl hydroxyethyl cellulose and the like, xanthan gum, gum arabic, polyvinyl alcohols, starch or a mixture thereof. Ethyl hydroxyethyl cellulose is the preferred binder.

The various additives used for this invention, such as retardant, plasticising, coalescing, dispersing and anti-foaming agents, preservatives and solvents are conventional and easily available on the market.

The coalescing agents are usually organic solvents which are used to obtain a drier, less sticky film.

They are used to improve filming, which may be adversely affected by various factors, especially low temperature, which prevents the polymer particles from fusing together when the water has evaporated. The additives solve this problem because they act as solvent of the polymer particles in dispersion, thus ensuring perfect fusion thereof even at low temperatures.

The retardant agents considerably increase the drying time, and regulate water release by slowing it.

A problem with drying time arises in summer; the higher temperature causes the water to evaporate more quickly, and this factor has an adverse effect because the plasterer does not have enough time for the application and the product dries out, which makes it more difficult to work with and considerably reduces its yield.

Furthermore, an excessively fast drying time would cause the product to lose its filmogenic characteristics.

The anti-foaming agent, which may be present even in small percentages, eliminates the foam formation caused when air is trapped in the viscous mass of the product during stirring.

Aqueous dispersions of hydrophobic polymeric fatty acids and oxyethylenated derivatives in oxo-alcohols, or mixtures of hydrocarbons and modified non-ionic fatty acids, can be used.

The wetting agents reduce the surface tension of the aqueous solvent and thus, in synergy with the dispersing agents, if any, aid wetting of the pigments and the coated fillers.

The plasticising agents assist in giving the film greater elasticity and resistance, producing films able to withstand dilation and microcracking of the walls to which they are applied.

The white pigments used for this invention are based on titanium dioxide, while metal oxides such as iron, chromium, copper and the like are used as coloured pigments.

A preferred composition of the synthetic stucco of the invention comprises:

| | |
|---|---|
| Water | 11–14 parts by weight |
| Ethyl hydroxyethyl cellulose | 0.28–0.40 |
| linear-chain sodium polyphosphate dispersing agent | 0.004–0.006 |
| 10–35% ammonia aqueous solution | 0.01–0.05 |
| Acrylic resin aqueous dispersion | 18–23 |
| Butyl glycol | 0.25–0.40 |
| Ethylene glycol | 0.30–0.50 |
| Anti-foaming agent based on oxo-alcohols and their derivatives | 0.15–0.25 |
| Wetting agent based on an aqueous solution of polyoxyethylenated and non-polyoxyethylenated surfactants | 0.20–0.35 |
| Plasticiser (e.g. modified long-chain paraffin wax) | 0.20–0.35 |
| Coated calcium carbonates | 60.0–65.0 |
| Preservative agent | 0.10–0.20 |
| Solvent - White spirit | 0.15–0.25 |
| Titanium dioxide or metal oxides | 2.8–3.5. |

Preparation of the ready-to-use antique-effect synthetic stucco according to the invention involves mixing the components such as water, cellulose, pH regulators, aqueous dispersions of acrylic esters, coalescing, retardant, anti-foaming, wetting and dispersing agents, plasticisers, preservatives, calcium carbonates and inorganic oxides.

The invention provides a translucent or matt synthetic stucco with an antique effect which is white, or coloured due to the presence of colouring pigments.

The stucco composition according to the invention allows easy application and less critical management of application times than a traditional lime-based stucco, as at least a 24-hour interval between coats is required at the temperature of 20° C.

The invention allows for the possibility of modifying the formulation of the product according to the period when it is applied, to take account of temperatures, for example.

The stucco composition according to the invention can be stored in plastic containers and transported to the place of use.

Before applying the stucco of the invention, it is sufficient to stir it manually with a trowel or a mechanical agitator to achieve good homogenisation, with no need to add water or solvents.

After opening of the container, any left-over product can be reused, even some time later, in view of the synthetic nature of the stucco, provided that contact with air is suitably prevented.

The stucco composition according to the invention has the following advantages:
  Particularly stable to atmospheric agents, UV rays and rapid changes in temperature;
  Characterised by good hydrophobia and a consequently low tendency to absorb water;
  Perfectly compatible with synthetically treated surfaces;
  The ideal consistency due to the presence of acrylic copolymers;
  Stability over time of colours and chromatic aspects.

The synthetic stucco of the invention can be applied in such a way as to give a smooth, matt or translucent appearance which produces numerous chromatic effects: if a matt appearance is required, a first layer of "paste" is laid on the surface to be treated, left to dry and sanded with abrasive paper, then a second very thin layer is laid and skimmed until a smooth surface is obtained.

To obtain a translucent appearance, when the second layer has dried it is polished until a mirror finish is obtained.

EXAMPLE 1

Preparation of White Synthetic Stucco
1. 5.10 Kg. Water
2. 0.50 Kg. 10% linear chain sodium polyphosphate aqueous solution.
3. 8.00 Kg. 4% aqueous solution cellulose paste—Bermocoll ethyl hydroxyethyl cellulose
4. 0.05 Kg. 31.0% ammonia aqueous solution
5. 20.0 Kg. Acrylic resin aqueous dispersion
6. 0.35 Kg. Butyl glycol
7. 0.40 Kg. Ethylene glycol
8. 0.10 Kg. Anti-foaming agent—dispersion of fatty acids, hydrophobic polymers and oxyethylenated derivatives in oxo-alcohols
9. 0.30 Kg. Wetting agent—aqueous solution of polyoxyethylenated and non-polyoxyethylenated surfactants
10. 0.30 Kg. Plasticiser—long-chain modified paraffin compounds
11. 61.5 Kg. Calcium carbonates, dimensions approx. 10 $\mu$m, coated with sodium stearate
12. 0.10 Kg. Anti-foaming agent—dispersion of fatty acids, hydrophobic polymers and oxyethylenated derivatives in oxo-alcohols
13. 0.10 Kg. Preservative—solution of of urea-formaldehyde condensation products and isothiazolinone derivatives
14. 0.20 Kg. White spirit
15. 3.0 Kg. titanium dioxide white pigment
STEP 1. Place ingredients 1, 2, 3, 4, 6, 7 and 9 in a turbodisperser and stir energetically for 5 minutes.
STEP 2. Add ingredient 15 to the "paste" from STEP 1. Stir for approx. 10 minutes until a homogenous composition is obtained.
STEP 3. Add ingredients 5, 8 and 10 to the "paste" from STEP 2 and leave under stirring for approx. 2 minutes.
STEP 4. Add ingredient 11 and stir for approx. 15 minutes, until a lump-free material of uniform composition is obtained.
STEP 5. Add ingredients 12, 13 and 14 to the "paste" and stir until a homogenous product is obtained.

EXAMPLE 2

Preparation of Coloured Synthetic Stucco.
1. 5.10 Kg. Water
2. 0.50 Kg. 10% linear chain sodium polyphosphate aqueous solution.
3. 8.00 Kg. Cellulose paste in 4% aqueous solution—Bermocoll ethyl hydroxyethyl cellulose
4. 0.05 Kg. 31.0% ammonia aqueous solution
5. 20.0 Kg. Acrylic resin aqueous dispersion
6. 0.35 Kg. Butyl glycol
7. 0.40 Kg. Ethylene glycol
8. 0.10 Kg. Anti-foaming agent—dispersion of fatty acids, hydrophobic polymers and oxyethylenated derivatives in oxo-alcohols
9. 0.30 Kg. Wetting agent—aqueous solution of polyoxyethylenated and non-polyoxyethylenated surfactants
10. 0.30 Kg. Plasticiser—long-chain modified paraffin compounds
11. 61.5 Kg. Calcium carbonate, dimensions approx. 10 $\mu$m, coated with sodium stearate
12. 0.10 Kg. Anti-foaming agent—dispersion of fatty acids, hydrophobic polymers and oxyethylenated derivatives in oxo-alcohols 13. 0.10 Kg. Preservative—solution of of urea-formaldehyde condensation products and isothiazolinone derivatives
14. 0.20 Kg. White spirit
15. 3.0 Kg. Inorganic pigments constituted by metal oxides STEP 1. Place ingredients 1, 2, 3, 4, 6, 7 and 9 in a turbodisperser and stir energetically for 5 minutes.

STEP 2. Add ingredient 15 to the "paste" from STEP 1. Stir for approx. 10 minutes, until a homogenous composition is obtained.

STEP 3. Add ingredients 5, 8 and 10 to the "paste" from STEP 2 and leave under stirring for approx. 2 minutes.

STEP 4. Add ingredient 11 and stir for approx. 15 minutes, until a lump-free material of uniform composition is obtained.

STEP 5. Add ingredients 12, 13 and 14 to the "paste" and stir until a homogenous product is obtained.

What is claimed is:

1. A synthetic stucco composition with a smooth matt or translucent appearance and an antique effect, comprising calcium carbonate with a particle size not exceeding 10 µm, coated with a film of sodium stearate, and an acrylic resin in agueous dispersion.

2. The composition as claimed in claim 1, wherein the acrylic resin comprises polymers of ethyl acrylate, butyl acrylate, acrylic and methacrylic acid and their esters.

3. The composition as claimed in claim 1, further comprising binders, pigments, dispersing, coalescing, anti-foaming and wetting agents, plasticisers, solvents and preservatives.

4. The composition as claimed in claim 1, wherein the coated calcium carbonate is present in a percent ranging from 50 to 70% by weight, and the acrylic resin in aqueous dispersion is present in a percentage between 15 and 25% by weight of said composition.

5. The composition as claimed in claim 1, wherein the coated calcium carbonate is present in percentages ranging from 60 to 65% by weight.

6. The composition as claimed in claim 1, comprising by weight of said composition:

| | |
|---|---|
| Water | 11.0–14.0% |
| Ethyl hydroxyethyl cellulose binder in the range | 0.28–0.40% |
| Linear chain sodium polyphosphate dispersing agent | 0.004–0.006% |
| 10–35% ammonia aqueous solution | 0.01–0.05% |
| Acrylic resin aqueous dispersion | 18–23% |
| Butyl glycol | 0.25–0.40% |
| Ethylene glycol | 0.30–0.50% |
| Anti-foaming agents based on oxo-alcohols and their derivatives | 0.15–0.25% |
| Wetting agent based on an aqueous solution of polyoxyethylenated and non-polyoxyethylenated surfactants | 0.200–0.35% |
| Modified long chain paraffin compound | 0.20–0.35% |
| Calcium carbonate coated with sodium stearate | 60.0–65.0% |
| Preservative agent | 0.100–0.200% |
| White spirit | 0.15–0.25% |
| Pigments | 2.8–3.5%. |

7. The composition as claimed in claim 6, wherein the pigments are titanium dioxide or metal oxides.

8. A synthetic stucco composition, comprising calcium carbonate with a particle size not exceeding 10 µm, coated with a film of sodium state, and an acrylic resin in dispersion, and wherein the composition comprises by weight, coated calcium carbonate present in percentages ranging from 60–65% by weight, and acrylic resin in an aqueous dispersion ranging from 18–23% by weight of said composition.

* * * * *